US010560375B2

(12) United States Patent
Lim (10) Patent No.: US 10,560,375 B2
(45) Date of Patent: Feb. 11, 2020

(54) PACKET FLOW INFORMATION INVALIDATION IN SOFTWARE-DEFINED NETWORKING (SDN) ENVIRONMENTS

(71) Applicant: VMware, Inc., Palo Alto, CA (US)

(72) Inventor: Harold Vinson Chao Lim, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/990,699

(22) Filed: May 28, 2018

(65) Prior Publication Data

US 2019/0363977 A1    Nov. 28, 2019

(51) Int. Cl.
*H04L 12/721* (2013.01)
*H04L 12/751* (2013.01)
*H04L 12/851* (2013.01)
*H04L 12/741* (2013.01)
*H04L 12/26* (2006.01)
*G06F 9/455* (2018.01)
*H04L 12/803* (2013.01)

(52) U.S. Cl.
CPC .......... *H04L 45/38* (2013.01); *G06F 9/45558* (2013.01); *H04L 43/028* (2013.01); *H04L 45/02* (2013.01); *H04L 45/745* (2013.01); *H04L 47/125* (2013.01); *H04L 47/2483* (2013.01); *G06F 2009/4557* (2013.01)

(58) Field of Classification Search
CPC ..... H04L 45/38; H04L 45/02; H04L 47/2483; H04L 47/125
See application file for complete search history.

(56) References Cited

U.S. PATENT DOCUMENTS 9,276,877 B1 * 3/2016 Chua ..................... H04L 45/02
2014/0226525 A1 * 8/2014 Eastlake, III .......... H04L 41/12
                                                                370/254
2016/0241474 A1 * 8/2016 Wang ................. H04L 45/7453

OTHER PUBLICATIONS

"Open vSwitch", Release 2.9.90, May 24, 2018.

* cited by examiner

*Primary Examiner* — Mohammad S Anwar
(74) *Attorney, Agent, or Firm* — SU IP Consulting (57) ABSTRACT

Example methods are provided for a first host to perform packet flow information invalidation in a software-defined networking (SDN) environment. One example method may comprise learning packet flow information based on one or more packets from a second host, the packet flow information being stored in association with a packet flow information identifier assigned to the second host. The method may further comprise: in response to detecting, from a third host or management entity, a notification indicating a network topology change that involves the second host, determining the packet flow information identifier assigned to the second host based on the notification; and invalidating the packet flow information stored in association with the packet flow information identifier.

15 Claims, 6 Drawing Sheets

PACKET FLOW INFORMATION INVALIDATION IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, hosts may learn packet flow information to facilitate packet handling in the SDN environment. However, in practice, the packet flow information may become invalid due to various reasons and subsequently cause incorrect packet handling, which is undesirable and adversely affects performance.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Various challenges relating to management of packet flow information will now be explained in more detail using FIG. 1, which is a schematic diagram illustrating example Software-Defined Networking (SDN) environment 100 in which packet flow information invalidation may be performed. It should be understood that, depending on the desired implementation, examples of the present disclosure may be implemented in any suitable network environment other than SDN environment 100. In practice, SDN environment 100 may include additional and/or alternative components than that shown in FIG. 1.

Figure 1:
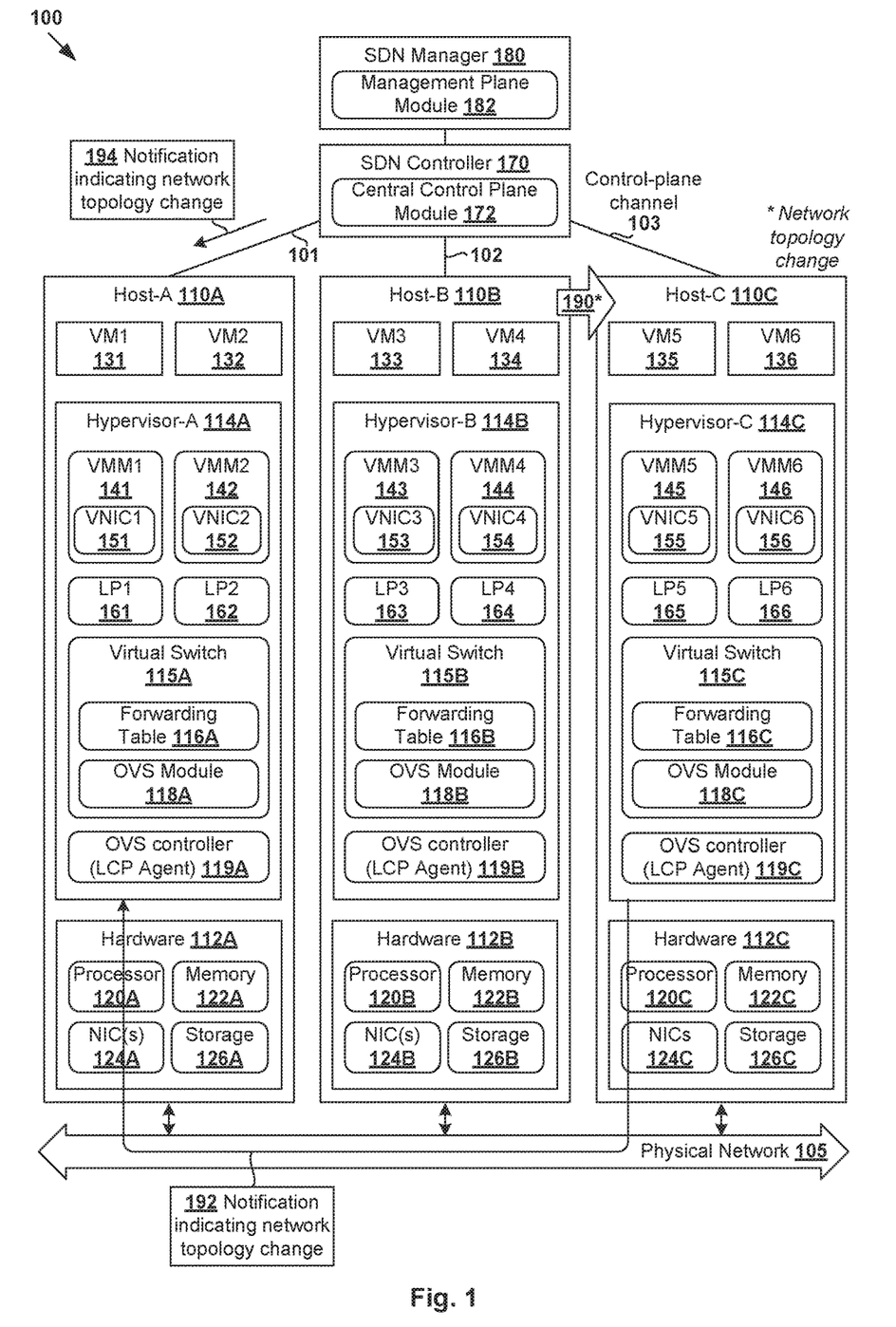
FIG. 1 is a schematic diagram illustrating an example Software-Defined Networking (SDN) environment in which packet flow information invalidation may be performed.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C, etc. Virtual resources are allocated to each VM to support a guest operating system (OS) and applications (not shown for simplicity). Corresponding to hardware 112A/112B/112C, the virtual resources may include virtual CPU, guest physical memory, virtual disk, virtual network interface controller (VNIC), etc. Hardware resources may be emulated using virtual machine monitors (VMMs) 141-146, which may be considered as part of corresponding VMs 131-136, or alternatively, separated from VMs 131-136. In the example in FIG. 1, VNICs 151-156 are emulated by corresponding VMMs 141-146. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B/114C further implements virtual switch 115A/115B/115C and a logical distributed router (DR) instance (not shown for simplicity) to handle egress packets from, and ingress packets to, corresponding VMs 131-136. In SDN environment 100, logical switches and logical distributed routers may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical distributed routers that provide logical layer-3 connectivity may be implemented collectively by DR instances and represented internally using routing tables (not shown for simplicity) at respective DR instances. Routing tables may each include entries that collectively implement the respective logical distributed routers.

Virtual switch 115A/115B/115C also maintains any suitable information to forward packets to and from corresponding VMs 131-136. Packets are received from, or sent to, each VM via an associated logical port. For example, logical ports 161-166 are associated with respective VMs 131-136. The term "packet" may refer generally to a group of bits that can be transported together, and may be in another form, such as "frame," "message," "segment," etc. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. SDN controller 170 and SDN manager 180 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 180. One example of an SDN manager is the NSX manager component that provides an interface for end users to perform any suitable configuration in SDN environment 100.

SDN controller 170 and SDN manager 180 support central control plane module 172 and management plane module 182, respectively. To send and receive the control information (e.g., configuration information), each host 110A/110B/110C may implement local control plane (LCP) agent 119A/119B/119C to interact with SDN controller 170. For example, control-plane channel 101/102/103 may be established between SDN controller 170 and host 110A/110B/110C using TCP over Secure Sockets Layer (SSL), etc. Management entity 170/180 may be implemented using physical machine(s), virtual machine(s), a combination thereof, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM3 133 and VM4 134 on host-B 110B may be located on the same logical layer-2 segment, such as VXLAN segment with VXLAN network identifier (VNI)=100. VM2 132, VM5 135 and VM6 136 may be located on a different logical layer-2 segment, such as VNI=200.

Each host 110A/110B/110C also maintains data-plane connectivity with other host(s) via physical network 105 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=100). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 105.

In SDN environment 100, virtual switch 115A/115B/115C (also known as "flow-based forwarding element") may implement Open vSwitch (OVS) module 118A/118B/118C to perform packet handling according to flow table entries or packet processing rules (also known as "flows") configured in a flow table. Each packet processing rule may be specified using match field(s) to be matched in response to detecting a packet, and an action to be performed when a match is found. As used herein, the term "flow-based forwarding element" may refer generally to any suitable forwarding element that is configurable to perform packet handling according to packet processing rules stored in a flow table. In practice, OVS module 118A/118B/118C may include any suitable user space and/or kernel space components (not shown in FIG. 1 for simplicity).

OVS controller 119A/119B/119C may configure or program virtual switch 115A/115B/115C by instructing OVS module 118A/118B/118C to install packet processing rules in a flow table, such as based on configuration requirements of various components (e.g., logical switches, logical routers, logical ports, etc.). The configuration may be performed using any suitable protocol, such as OpenFlow protocol (a trademark of the Open Networking Foundation), etc. This way, datapath flow may be programmed using a flow table during packet forwarding. In practice, OVS controller 119A/119B/119C may also instruct OVS module 118A/118B/118C to install packet processing rules with a learn action for learning packet flow information that may be used for subsequent packet handling.

As used herein, the term "packet flow information" is used broadly to include but not limited to the following: inner and/or outer header extracted from ingress or egress packets (e.g., source or destination MAC address information, IP address information, port number information, protocol information, etc.), packet payload information, VTEP information (e.g., VTEP label, VTEP IP address information, VTEP MAC address information, etc.), logical network information (e.g., VNI, etc.), logical network element information (e.g., logical switch, logical router, logical port, VNIC, etc.), any combination thereof.

Once learned, the packet flow information may also be used to generate a new packet processing rule (also known as a "learned flow") with match field(s) and action(s) automatically. For example, a new packet processing rule may be generated to determine a packet type, such as whether an Address Resolution Protocol (ARP) packet from a particular IP address=K is a Gratuitous ARP (GARP) packet, etc. For a GARP packet, its source IP address is usually the same as its destination IP address. In this case, based on packet flow information=(source IP address, destination IP address) learned from an ARP packet, the new packet processing rule may be generated to include match fields (source IP address==K, destination IP address==K). Depending on the desired implementation, any alternative and/or additional packet processing rules may be generated.

Using OVS module 118A/118B/118C and OVS controller 119A/119B/119C, virtual switch 115A/115B/115C may learn packet flow information, as well as generate new packet processing rules, dynamically to facilitate subsequent packet handling. The learned packet flow information is generally maintained in a flow table until one of the following occurs: (1) when a predetermined timeout value is reached, (2) when the existing packet flow information is replaced or overwritten by new packet flow information, (3) when the corresponding flow table entry with the learn action is deleted, and (4) the packet flow information is manually deleted, such as by a network administrator.

However, in practice, changes in the underlying network topology may affect the validity of learned packet flow information. For example, as a result of a network topology change involving host-B 110B (which may or may not be a result of an explicit configuration change from a user), packet flow information associated with host-B 110B may not be applicable anymore. In some cases, the packet flow information may even cause incorrect routing of packets, which is undesirable in SDN environment 100.

Packet Flow Information Invalidation

According to examples of the present disclosure, packet flow information learned by a first host (e.g., host-A 110A) may be managed in an improved manner in SDN environment 100. In particular, in response to a network topology change involving a second host (e.g., host-B 110B), the first host may invalidate packet flow information associated with the second host. This way, packet flow information that is no longer applicable may be flushed or removed to avoid, or at least reduce the likelihood of, incorrect packet handling. This in turn improves host and network performance in SDN environment 100.

Figure 2:
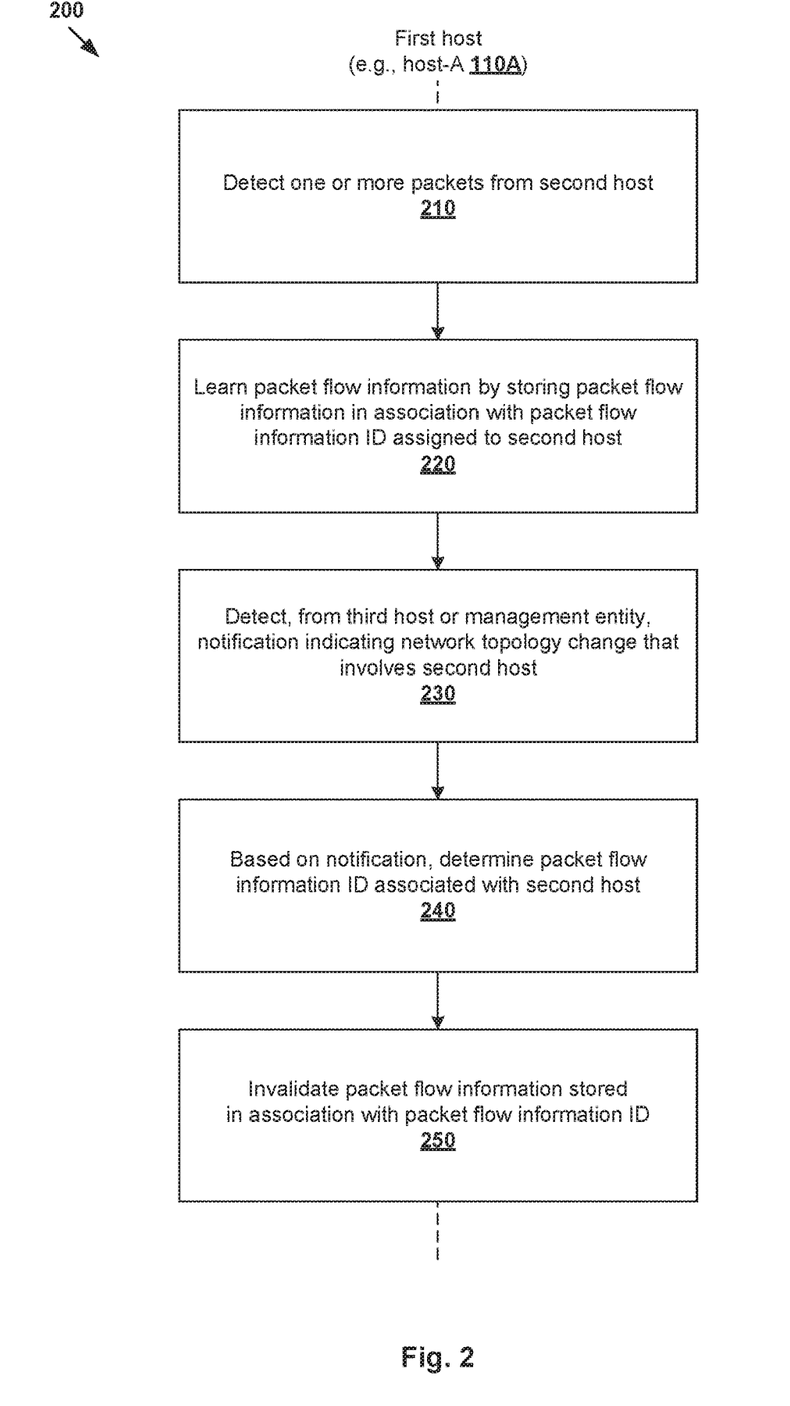
FIG. 2 is a flowchart of an example process for a first host to perform packet flow information invalidation in an SDN environment.

In more detail, FIG. 2 is a flowchart of example process 200 for a first host to perform packet flow information invalidation in SDN environment 100. Example process 200 may include one or more operations, functions, or actions illustrated by one or more blocks, such as 210 to 250. The various blocks may be combined into fewer blocks, divided into additional blocks, and/or eliminated depending on the desired implementation. In the following, various examples will be described using host-A 110A as an example "first host," host-B 110B as example "second host," host-C 110C as example "third host," SDN controller 170 as example "management entity" and virtual switches 115A-C as example "flow-based forwarding elements," etc. In practice, examples of the present disclosure may be implemented by any suitable host 110A/110B/110C, such as using OVS module 118A/118B/118C and/or OVS controller 119A/119B/119C, etc.

At 210 and 220 in FIG. 2, in response to detecting packet(s) from second host-B 110B, first host-A 110A learns packet flow information based on the packet(s). As will be discussed further using FIG. 3 to FIG. 5, first host-A 110A may assign second host-A 110A with a packet flow information identifier (ID). This way, the packet flow information learned based on packet(s) from second host-B 110B may be stored in association with the packet flow information ID assigned to second host-B 110B. The packet(s) may originate from second host-B 110B or, as will be exemplified using FIG. 3 and FIG. 4, another host with which first host-A 110A communicates via second host-B 110B.

At 230 in FIG. 2, first host-A 110A receives a notification indicating a network topology change that involves second host-B 110B. As used herein, the term "network topology change" may refer generally to an event that affects the validity of packet flow information, such as failover from one host to another, migration of a virtualized computing instance (e.g., VM) from one host to another, load balancing among hosts, etc. For example in FIG. 1, the network topology change may be a failover from second host-B 110B to third host-C 110C (see 190). In one example, the notification may be received from third host-C 110C via a datapath supported by underlying physical network 105 (see 192). In another example, the notification may be received from SDN controller 170 or SDN manager 180 via control-plane channel 101 (see 194). In practice, notification 192/194 may be in any suitable form, such as a special packet (e.g., with GENEVE options header), etc.

At 240 and 250 in FIG. 2, in response to detecting notification 192/194, first host-A 110A determines the packet flow information ID assigned to second host-B 110B based on the notification, and invalidates the packet flow information stored in association with the packet flow information ID. For example, notification 192/194 may include a host ID associated with second host-B 110B, which may be used to determine the packet flow information ID at block 240. Using notification 192/194 and packet flow information ID, packet flow information that is no longer valid following the network topology change involving second host-B 110B may be grouped, identified and flushed.

As will be discussed further in the examples in FIG. 3 to FIG. 6, notification 192/194 may be detected by OVS module 118A at virtual switch 115A supported by host-A 110A by matching notification 192/194 with match field(s) of a first packet processing rule configured in a flow table for detecting the network topology change. OVS module 118A may then perform an action specified by the first packet processing rule by sending notification 192/194 to OVS controller 119C. Once the packet flow information ID is determined at block 240, OVS controller 119C may generate and send an instruction to OVS module 118A to remove the packet flow information at block 250. In the following, various examples will be discussed using FIG. 3 to FIG. 6.

Learning Phase

Figure 3:
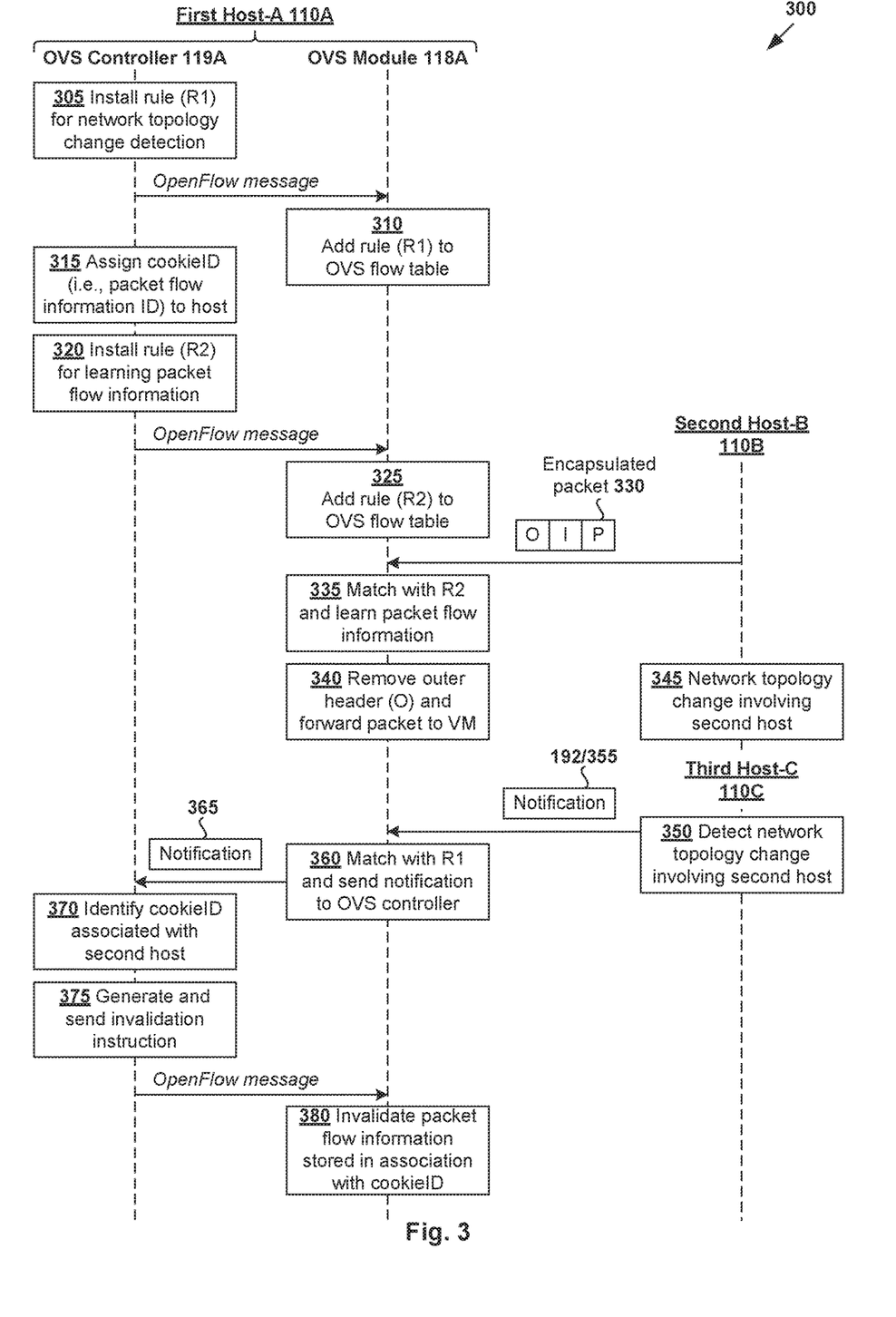
FIG. 3 is a flowchart of an example detailed process for a first host to perform packet flow information invalidation in an SDN environment.

FIG. 3 is a flowchart of example detailed process 300 for packet flow information invalidation in SDN environment 100. Example process 300 may include one or more operations, functions, or actions illustrated at 310 to 380. The various operations, functions or actions may be combined into fewer blocks, divided into additional blocks, and/or eliminated depending on the desired implementation. Example process 300 may be implemented by host 110A/110B/110C using any suitable module(s), such as OVS module 118A/118B/118C at virtual switch 115A/115B/115C, OVS controller 119A/119B/119C, etc.

FIG. 3 will be explained using FIG. 4, which is a schematic diagram illustrating example packet flow information learning 400 in SDN environment 100. In the example in FIG. 4, host-A 110A communicates with host-D 110D via host-B 110B and/or host-C 110C. In the case of layer-2 bridging, host-B 110B may act as a bridge between host-A 110A and host-D 110D located on different networks. In the case of layer-3 north-south traffic handling, host-B 110B may act as an edge gateway that connects host-A 110A with host-D 110D via an external (public) network. In this case, host-B 110B may support a logical router port via which traffic to and from the edge gateway is forwarded. In practice, host-A 110A and host-B 110B may be located at geographically dispersed sites.

At 305 and 310 in FIG. 3, OVS controller 119A instructs OVS module 118A to install a packet processing rule denoted as "R1" for detecting network topology changes. The instruction for rule installation may be implemented using any suitable protocol, such as OpenFlow, etc. Referring also to FIG. 4, OVS module 118A maintains flow table 410 that includes multiple flow table entries or packet processing rules. Each rule specifies match field(s) to be matched in response to receiving a packet, and an action to be performed when a match is found.

For example, first rule 411 may be installed to detect a notification indicating a network topology change involving a particular host, such as in the form of a special packet with GENEVE options header (e.g., options for MAC flush). In this case, first rule 411 may specify "match outer header==hostID" and corresponding action="send notification to OVS controller" that causes OVS module 118A to forward the notification to OVS controller 119A. In practice, OVS controller 119A may assign first rule 411 with a higher priority compared to other rules 412-413.

At 315 in FIG. 3, OVS controller 119A assigns a packet flow information ID (referred to as "cookieID") to host 110B/110C that is in communication with host-A 110A. Any suitable approach may be used to assign the packet flow information ID, such as based on a tunnel port via which ingress traffic is received. In the example in FIG. 4, OVS controller 119A assigns cookieID=X to host-B 110B, where cookieID=X identifies first tunnel port=X (not shown for simplicity) via which host-A 110A communicates with host-B 110B. Similarly, OVS controller 119A assigns cookieID=Z to host-C 110C, where cookieID=Z identifies second tunnel port=Z (also not shown) via which host-A 110A communicates with host-C 110C.

Mapping information (hostID, cookieID) associated with host 110B/110C may be stored mapping table 420 maintained by OVS controller 119A, such as (hostID=VTEP-B, cookieID=X) and (hostID=VTEP-C, cookieID=Z). See corresponding 421-422. In SDN environment 100, hostID=VTEP-B may be a unique ID (e.g., 17-bit VTEP label) assigned by SDN controller 170 or SDN manager 180 to uniquely identify host-B 110B, and hostID=host-C to uniquely identify host-C 110C. In practice, packet flow information ID may be assigned any suitable other approach, an example of which will be explained using FIG. 6.

At 325 in FIG. 3, OVS controller 119A instructs OVS module 118A to install packet processing rule(s) denoted as "R2" for learning packet flow information. The instruction for rule installation may be implemented using any suitable protocol, such as OpenFlow, etc. In the example in FIG. 4, second rule 412 may be installed to match packets received via a particular tunnel port associated with host-B 110B. If a match is found, a learn action is performed to learn packet flow information, such as by storing (cookieID, MAC address, VTEP label, logical network ID) in packet flow information table 430 ("table Y") in the example FIG. 4. Second rule 412 may specify match field=ingress tunnel port X associated with host-B 110B and action=LearnAction (cookieID=X, table=Y, expr=(dst_mac=src_mac, metadata=vni, action=vtep_label->REG2). Similarly, third rule 413 may be installed to match packets received via ingress tunnel port=Z associated with host-C 110C and action=LearnAction(cookieID=Z, table=Y, expr=(dst_mac=src_mac, metadata=vni, action=vtep_label->REG3).

At 330 and 335 in FIG. 3, in response to receiving an encapsulated packet from host 110B/110C, OVS module 118A determines whether the encapsulated packet has a matching rule in flow table 410. If yes, an action specified by the matching rule will be performed. Some example encapsulated packets will be explained using FIG. 4.

(a) In a first example, host-A 110A receives, via tunnel port=X, first encapsulated packet 440 that includes an outer header (labelled "O") and an inner packet that includes an inner header (labelled "I") and packet payload. As shown at 441 in FIG. 4, the inner header specifies source address information (source IP address=IP-VM7, source MAC address=MAC-VM7) associated with VM7 137 supported by host-D 110D and destination address information (destination IP address=IP-VM1, destination MAC address=MAC-VM1) associated with VM1 131 supported by host-A 110A.

Figure 4:
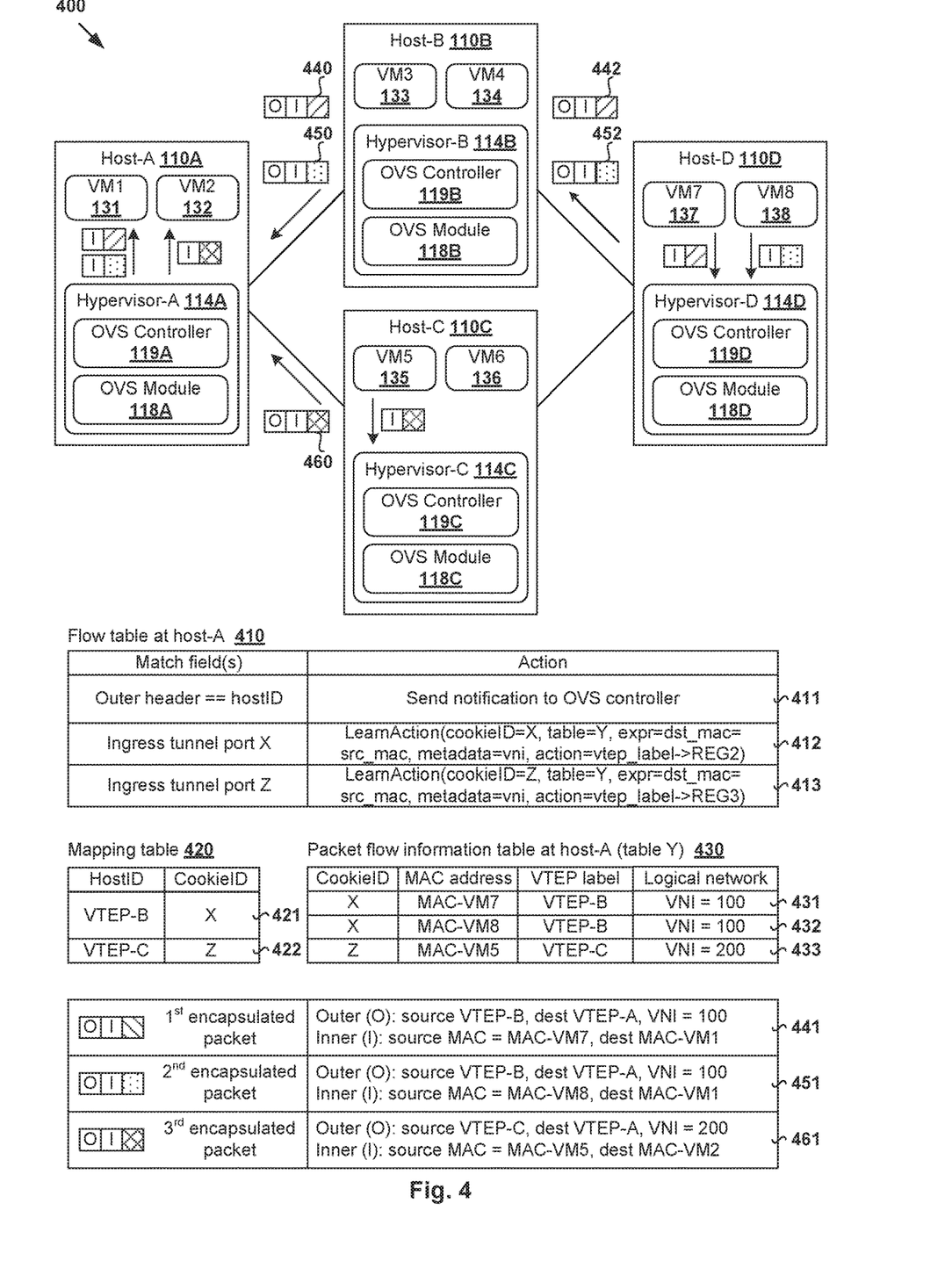
FIG. 4 is a schematic diagram illustrating example packet flow information learning in an SDN environment.

Also shown at 441 in FIG. 4, the outer header of first encapsulated packet 440 specifies source VTEP information (VTEP IP address=IP-B, VTEP MAC address=MAC-B, VTEP label=VTEP-B) associated with host-B 110B, destination VTEP information (VTEP IP address=IP-A, VTEP MAC address=MAC-A, VTEP label=VTEP-A) associated with host-A 110A and logical network ID (VNI=100) associated with a logical network on which source VM7 137 is located. Note that the outer header in first encapsulated packet 440 may be different from the outer header in corresponding encapsulated packet 442 sent from host-D 110D to host-B 110B. For example, the latter 442 may be addressed from VTEP-D at host-D 110D to VTEP-B at host-B 110B, instead of from VTEP-B to VTEP-A.

In response to receiving first encapsulated packet 440 via tunnel port=X, OVS module 118A at host-A 110A determines that second rule 412 is matched. As such, the corresponding learn action is performed to store first packet flow information 431 (MAC address=MAC-VM7, VTEP label=VTEP-B, VNI=100) in association with cookieID=X in packet flow information table 430. Further, according to 340 in FIG. 3, OVS module 118A performs decapsulation on first encapsulated packet 440 to remove the outer header before forwarding the inner packet to VM1 131.

(b) In a second example, host-A 110A receives, via tunnel port=X, second encapsulated packet 450 that includes an outer header (O) and an inner packet that includes an inner header (I) and packet payload. As shown at 451 in FIG. 4, the inner header specifies source address information (source IP address=IP-VM8, source MAC address=MAC-VM8) associated with VM8 138 supported by host-D 110D and destination address information (destination IP address=IP-VM1, destination MAC address=MAC-VM1) associated with VM1 131.

Also shown at 451 in FIG. 4, the outer header specifies source VTEP information (VTEP IP address=IP-B, VTEP MAC address=MAC-B, VTEP label=VTEP-B) associated with host-B 110B, destination VTEP information (VTEP IP address=IP-A, VTEP MAC address=MAC-A, VTEP label=VTEP-A) associated with host-A 110A and logical network ID (VNI=100) associated with a logical network on which VM8 138 is located. Note that the outer header in second encapsulated packet 450 may be different from the outer header in corresponding encapsulated packet 452 that is sent from host-D 110D to host-B 110B. Similar to the first example, the latter 452 may be addressed from VTEP-D at host-D 110D to VTEP-B at host-B 110B, instead of from VTEP-B to VTEP-A in the former 450.

In response to detecting second encapsulated packet 450 via tunnel port=X, OVS module 118A at host-A 110A determines that second rule 412 is matched, and performs the learn action. In particular, OVS module 118A stores second packet flow information 432 in the form of (MAC address=MAC-VM8, VTEP label=VTEP-B, VNI=100) in association with cookieID=X in table 430. Further, according to 340 in FIG. 3, OVS module 118A performs decapsulation on second encapsulated packet 450 to remove the outer header before forwarding the inner packet to VM1 131.

(c) In a third example, host-A 110A receives, via tunnel port=Z, third encapsulated packet 460 that includes an outer header (O) and an inner packet that includes an inner header (I) and packet payload. As shown at 461 in FIG. 4, the inner header specifies source address information (source IP address=IP-VM5, source MAC address=MAC-VM5) associated with VM5 135 supported by host-C 110C and destination address information (destination IP address=IP-VM2, destination MAC address=MAC-VM2) associated with VM2 132 supported by host-A 110A.

Also shown at 461 in FIG. 4, the outer header specifies source VTEP information (VTEP IP address=IP-C, VTEP MAC address=MAC-C, VTEP label=VTEP-C) associated with host-C 110C, destination VTEP information (VTEP IP address=IP-A, VTEP MAC address=MAC-A, VTEP label=VTEP-A) associated with host-A 110A and logical network ID (VNI=200) associated with a logical network on which VM5 135 is located. In response to detecting third encapsulated packet 460, OVS module 118A determines that third rule 413 is matched, and performs the learn action specified by third rule 413. In particular, OVS module 118A stores third packet flow information 433 in the form of (MAC address=MAC-VM5, VTEP label=VTEP-C, VNI=200) in association with cookieID=Z in table 430. According to 340 in FIG. 3, OVS module 118A performs decapsulation on third encapsulated packet 460 to remove the outer header before forwarding the inner packet to VM2 132.

Packet flow information 431-433 may be used by OVS module 118A to facilitate subsequent egress packet handling. For example, based on first packet flow information (cookieID=X, MAC address=MAC-VM7, VTEP label=VTEP-B, VNI=100), any egress packet addressed to destination MAC address=MAC-VM7 may be forwarded to destination VTEP label=VTEP-B associated with host-B 110B, which acts as a bridge or gateway between host-A 110A and host-D 110D. Similarly, based on (cookieID=X, MAC address=MAC-VM8, VTEP label=VTEP-B, VN=100), any egress packet addressed to destination MAC address=MAC-VM8 may be forwarded to destination VTEP label=VTEP-B associated with host-B 110B for subsequent transmission to host-D 110D. Further, based on (cookieID=Z, MAC address=MAC-VM5, VTEP label=VTEP-C, VNI=200), any egress packet addressed to MAC address=MAC-VM5 may be forwarded to VTEP label=VTEP-C associated with host-C 110C.

Invalidating Phase

In practice, the validity of packet flow information 431-433 may be affected by network topology changes in SDN environment 100. For example, if there is a network topology change involving host-B 110B, packet flow information 431-432 may no longer be valid and, if used, cause incorrect packet forwarding to host-B 110B. According to examples of the present disclosure, packet flow information invalidation may be performed to improve performance. Some example will be explained using blocks 345-380 in FIG. 3 and FIG. 5, which is a schematic diagram illustrating first example packet flow information invalidation 500 in SDN environment 100.

At 345 in FIG. 3, a network topology change may occur in SDN environment 100 for various reasons, such as failover, VM migration, load balancing, etc. In the example in FIG. 5, there may be a failover from host-B 110B and host-C. In the case of layer-2 bridging, host-C 110C takes over from host-B 110B to act as a bridge between host-A 110A and host-D 110D. In the case of layer-3 north-south traffic handling, host-C 110C takes over from host-B 110B to act as an edge gateway to facilitate communication between host-A 110A and host-D 110D. See corresponding 510 in FIG. 5 (related to 190 in FIGS. 1).

At 350 and 355 in FIG. 3, in response to detecting the network topology change involving host-B 110B, host-C 110C generates and sends a notification to inform host-A 110A accordingly. In the example in FIG. 5, in response to detecting that host-B 110B has failed and necessitates a failover, OVS controller 119C at host-C 110C may generate and send notification 520 (related to 192 in FIG. 1) to host-A 110A. Any suitable encapsulation protocol may be used to generate notification 520, such as GENEVE, etc. For example, notification 520 may include a flag indicating that it is a special packet and metadata specifying hostID=VTEP-B identifying host-B 110B. In this example, notification 520 may be sent via a regular network datapath that is used for packet forwarding between host-C 110C and host-A 110A. Using this approach, it is not necessary to use a control path or out-of-band communication channel between the hosts for network topology change detection.

At 360 and 365 in FIG. 3, in response to detecting notification 520 from host-B 110B, OVS module 118A may determine that notification 520 matches with first rule 411 in flow table 410 and performs the action specified by first rule 411 by sending notification 520 to OVS controller 119A accordingly. Based on hostID=VTEP-B in notification 520, OVS controller 119A determines that invalidation of packet flow information associated with host-B 110B is required. In response, at 370, OVS controller 119A identifies cookieID=X associated with hostID=VTEP-B based on mapping information 421 in table 420. Next, at 375, OVS controller 119A generates and sends an instruction to OVS module 118A to invalidate packet flow information associated with cookieID=X. This way, packet flow information 431-432 to be invalidated may be grouped and identified more efficiently using the cookieID.

At 380 in FIG. 3, based on the instruction (e.g., OpenFlow message), OVS module 118A invalidates (e.g., removes, deletes or flushes) packet flow information 431-432 associated with cookieID=X. Once invalidated, OVS module 118A will not rely on first packet flow information 431=(cookieID=X, MAC-VM7, VTEP-B, 100) to send egress packets to VM7 137 associated with MAC-VM7, and second packet flow information 432=(cookieID=X, MAC-VM8, VTEP-B, 100) to send egress packet to VM8 138 associated with MAC-VM8. This reduces the likelihood of, if not eliminates, incorrect forwarding of packets to host-B 110B. In contrast, packet flow information 433 associated with cookieID=Z remains valid and unchanged in table 430.

In the example in FIG. 5, host-A 110A may subsequently learn new packet flow information 540/560 based on encapsulated packet 530/550 from host-C 110C after network topology change 190/510. For example, in response to receiving fourth encapsulated packet 530 from host-C 110C, OVS module 118A at host-A 110A determines that second rule 412 is matched, and performs the learn action specified by second rule 412. In particular, OVS module 118A stores packet flow information 540 in the form of (cookieID=X, MAC address=MAC-VM7, VTEP label=VTEP-C, VNI=100) in table 430. See corresponding 531 in FIG. 5.

Further, in response to receiving fifth encapsulated packet 550 from host-C 110C, OVS module 118A determines that second rule 412 is matched, and performs the learn action specified by second rule 412. In particular, OVS module 118A stores packet flow information 560 in the form of (cookieID=X, MAC address=MAC-VM8, VTEP label=VTEP-C, VNI=100) in table 430. See corresponding 561 in FIG. 5. This way, any subsequent egress packet addressed to destination MAC address=MAC-VM7 or MAC-VM8 may be forwarded to host-D 110D via host-C 110C instead of host-B 110B after network topology change 510.

Figure 6:
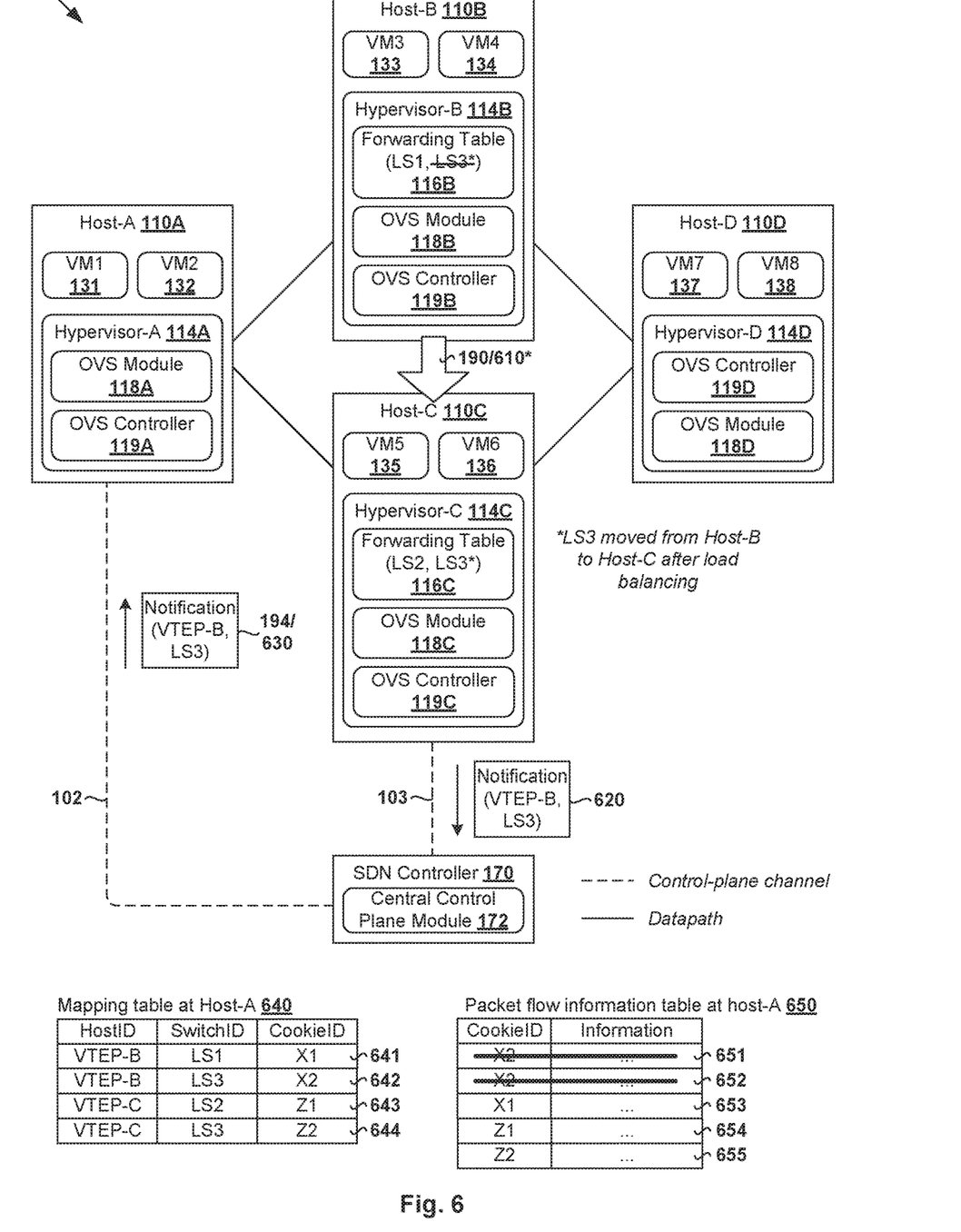
FIG. 6 is a schematic diagram illustrating second example packet flow information invalidation in an SDN environment.

Another example is shown in FIG. 6, which is a schematic diagram illustrating second example packet flow information invalidation 600 in SDN environment 100. In this example, a load balancing mechanism may cause network topology change 190/610 involving host-B 110B and host-C 110C. In an example active-active configuration, host-B 110B manages a subset of logical switches (e.g., LS1 and LS3 in forwarding table 116B) while host-C 110C manages another subset (e.g., LS2). Instead of a failover scenario, load balancing may be performed to move, for example, logical switch LS3 from host-B 110B to host-C 110C.

Figure 5:
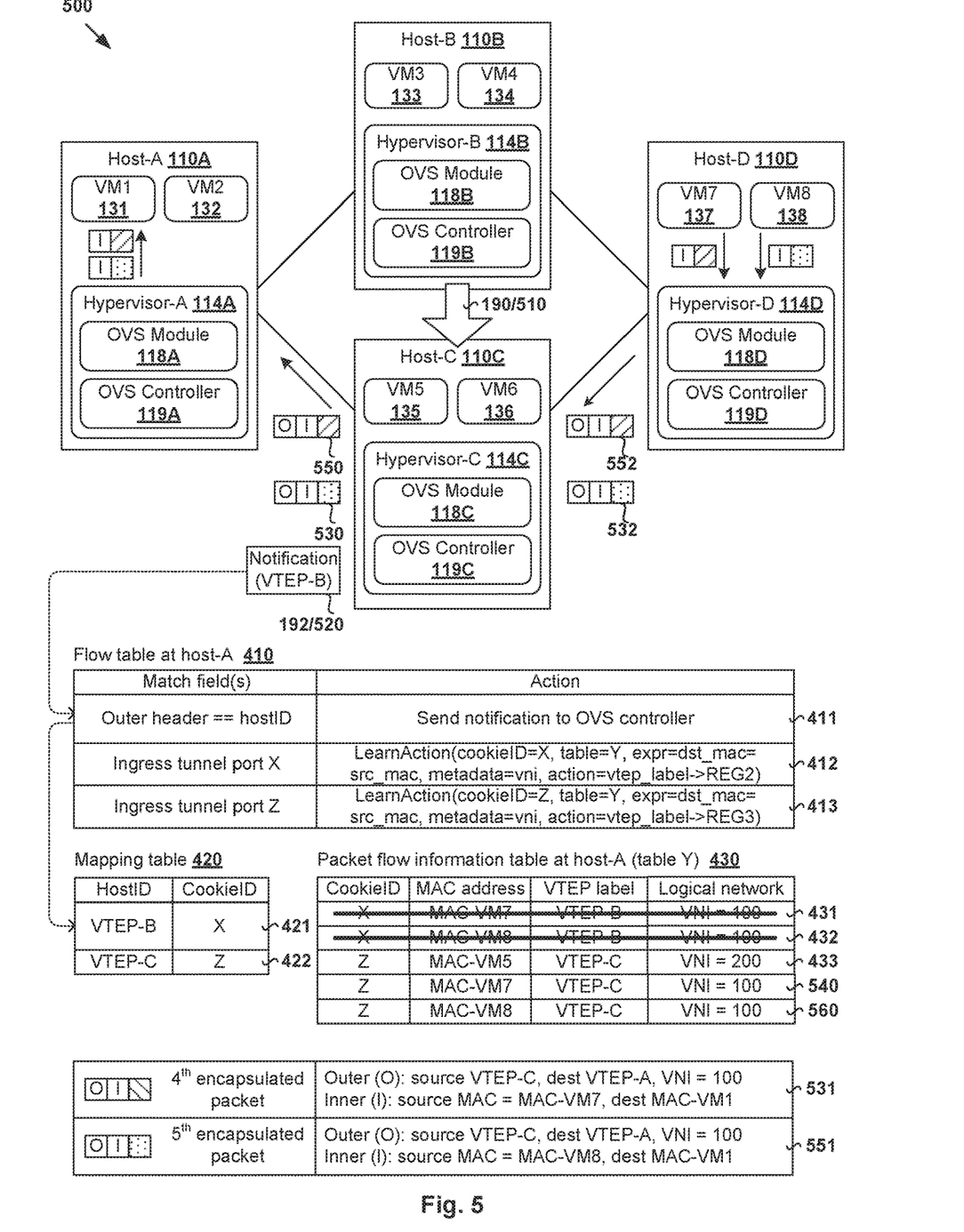
FIG. 5 is a schematic diagram illustrating first example packet flow information invalidation in an SDN environment.

In response to detecting network topology change 190/610, host-C 110C may generate and send a notification to host-A 110A directly similar to the example in FIG. 5. Alternatively, as shown in FIG. 6, host-C 110C may report to SDN controller 170 (see 620 in FIG. 6) via control-plane channel 103. This causes SDN controller 170 to notify host-A 110A accordingly via control-plane channel 104. Compared to the example in FIG. 5, the control-plane approach in FIG. 6 may reduce unnecessary bandwidth consumption on the data plane. However, the data plane approach is not reliant on the central control plane to be up. For example, even if out-of-band connection to SDN controller 170 is down, packet flow information may still be invalidated using the example in FIG. 5. It should be understood that, instead of host-C 110C, host-B 110B may report network topology change 190/610 to SDN controller 170. Further, alternatively or additionally, network topology change 190/610 may be detected by SDN controller 170 (i.e., performs block 350 in FIG. 3).

Notification 620/630 may include hostID=VTEP-B associated with host-B 110B and/or logical switch ID=LS3. In this case, host-A 110A may assign packet flow information ID (i.e., cookieID) to host 110B/110C based on a combination of host ID and logical switch ID. For example, host-B 110B may be assigned with cookieID=X1 based on (VTEP-B, LS1) and cookieID=X2 based on (VTEP-B, LS3). Further, host-C 110C may be assigned with cookieID=Z1 based on (VTEP-C, LS2) and cookieID=Z2 based on (VTEP-C, LS3). Following network topology change 190/610, packet flow information 651-652 associated with cookieID=X2 may be invalidated and flushed from table 650. Packet flow information 653-654 associated with cookieID=X1 or Z1 remains unchanged. New packet flow information 655 associated with cookieID=Z2 may be learned after LS3 is moved from host-B 110B to host-C 110C. Depending on the desired implementation, VNI may also be used as a logical switch ID.

Examples of the present disclosure should be contrasted against conventional approaches that rely on Gratuitous Address Resolution Protocol (GARP) or Reverse ARP (RARP) messages to inform VMs that a failed-over host manages. For example, in the case of layer-2 bridging, host-B 110B may act as a bridge for thousands of VMs. In this case, a GARP or RARP message will be generated and sent to each and every VM, thereby causing a lot of unnecessary bandwidth consumption and adversely affecting other packet transmission. In contrast, according to examples of the present disclosure, network topology change may be detected based on a notification form host-C 110C or SDN controller 170, which is more scalable and efficient to implement in SDN environment 100 with a large number of hosts and VMs.

Although a single "flow table" and a single "flow table entry" (e.g., see respective 410 and 411-413 in FIGS. 4-5) are shown and explained for descriptive simplicity, it should be understood that a particular "flow entry" may include a set of flow tables and a particular "flow table entry" may include a set of entries in practice. Depending on the desired implementation, examples of the present disclosure may be implemented using OVS, which is available from the Linux Foundation (a trademark of The Linux Foundation). Detailed description of flow table and flow table entries is available from various documentation and source code of OVS. An example is a document entitled "Open vSwitch Release 2.9.90," which is published on May 24, 2018 and incorporated herein by reference. Disclosure in any prior and future version(s) of this document may also be applicable.

Container Implementation

Although explained using VMs 131-138, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-138. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-onvirtual-machine" approach) not only leverages the benefits of container technologies but also that of virtualization technologies. The containers may be executed as isolated processes inside respective VMs. Packet flow information discussed using FIG. 1 to FIG. 6 may also include container information, such as container MAC or IP address information, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. According to the examples in FIG. 1 to FIG. 6, computer system(s) capable of performing as SDN controller 170, SDN manager 180 and hosts 110A-D may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a first host to perform packet flow information invalidation in a software-defined networking (SDN) environment that includes the first host, a second host, and a third host or a manager, the method comprising:
    populating a flow table of a flow-based forwarding element supported by the first host with a flow table entry, wherein the flow table entry specifies a first packet processing rule configured for matching one or more match fields of the first packet processing rule with packets containing notifications that indicate a network topology change;
    in response to detecting, from the second host, one or more packets, learning packet flow information based on the one or more packets, wherein the packet flow information is stored in association with a packet flow information identifier assigned to the second host;
    receiving, from the third host or the manager, a notification indicating a network topology change that involves the second host;
    matching, by the flow-based forwarding element, the notification with the one or more match fields of the first packet processing rule in the flow table;
    performing, by the flow-based forwarding element, an action specified by the first packet processing rule, wherein the action comprises sending a corresponding notification to a local controller supported by the first host, and wherein the local controller is configured to determine the packet flow information identifier assigned to the second host based on the corresponding notification; and
    invalidating the packet flow information stored in association with the packet flow identifier.

2. The method of claim 1, wherein determining the packet flow information identifier by the local controller comprises:
    based on at least a host identifier associated with the second host in the notification, determining the packet flow information identifier associated with the host identifier.

3. The method of claim 1, wherein invalidating the packet flow information comprises:
    generating and sending, by the local controller, an instruction to the flow-based forwarding element to remove the packet flow information stored in association with the packet flow information identifier.

4. The method of claim 1, wherein learning the packet flow information comprises:
    matching, by the flow-based forwarding element, the one or more packets with a second packet processing rule configured in the flow table; and
    performing a learn action, specified by the second packet processing rule, to learn the packet flow information.

5. The method of claim 1, wherein receiving the notification comprises:
    receiving the notification in response to the third host or the management entity detecting at least one of the following network topology changes: a failover from the second host to the third host, migration of a virtualized computing instance from the second host to the third host, and load balancing between the second host and the third host.

6. A non-transitory computer-readable storage medium that includes a set of instructions which, in response to execution by a processor of a first host, cause the processor to perform a method of packet flow information invalidation in a software-defined networking (SDN) environment that includes the first host, a second host, and a third host or a manager, wherein the method comprises:
populating a flow table of a flow-based forwarding element supported by the first host with a flow table entry, wherein the flow table entry specifies a first packet processing rule configured for matching one or more match fields of the first packet processing rule with packets containing notifications that indicate a network topology change;
in response to detecting, from the second host, one or more packets, learning packet flow information based on the one or more packets, wherein the packet flow information is stored in association with a packet flow information identifier assigned to the second host;
receiving, from the third host or the manager, a notification indicating a network topology change that involves the second host;
matching, by the flow-based forwarding element, the notification with the one or more match fields of the first packet processing rule in the flow table;
performing, by the flow-based forwarding element, an action specified by the first packet processing rule, wherein the action comprises sending a corresponding notification to a local controller supported by the first host, and wherein the local controller is configured to determine the packet flow information identifier assigned to the second host based on the corresponding notification; and
invalidating the packet flow information stored in association with the packet flow information identifier.

7. The non-transitory computer-readable storage medium of claim 6, wherein determining the packet flow information identifier by the local controller comprises:
based on at least a host identifier associated with the second host in the notification, determining the packet flow information identifier associated with the host identifier.

8. The non-transitory computer-readable storage medium of claim 6, wherein invalidating the packet flow information comprises:
generating and sending, by the local controller, an instruction to the flow-based forwarding element to remove the packet flow information stored in association with the packet flow information identifier.

9. The non-transitory computer-readable storage medium of claim 6, wherein learning the packet flow information comprises:
matching, by the flow-based forwarding element, the one or more packets with a second packet processing rule configured in the flow table; and
performing a learn action, specified by the second packet processing rule, to learn the packet flow information.

10. The non-transitory computer-readable storage medium of claim 6, wherein receiving the notification comprises:
receiving the notification in response to the third host or the management entity detecting at least one of the following network topology changes: a failover from the second host to the third host, migration of a virtualized computing instance from the second host to the third host, and load balancing between the second host and the third host.

11. A first host configured to perform packet flow information invalidation in a software-defined networking (SDN) environment that includes the first host, a second host, and a third host or a manager, the first host comprising:
a processor; and
a non-transitory computer-readable medium having stored thereon instructions that, in response to execution by the processor, cause the processor to:
populate a flow table of a flow-based forwarding element supported by the first host with a flow table entry, wherein the flow table entry specifies a first packet processing rule configured for matching one or more match fields of the first packet processing rule with packets containing notifications that indicate a network topology change;
in response to detecting, from the second host, one or more packets, learn packet flow information based on the one or more packets, wherein the packet flow information is stored in association with a packet flow information identifier assigned to the second host;
receive, from the third host or the manager, a notification indicating a network topology change that involves the second host;
match, by the flow-based forwarding element, the notification with the one or more match fields of the first packet processing rule in the flow table;
perform, by the flow-based forwarding element, an action specified by the first packet processing rule, wherein the action comprises sending a corresponding notification to a local controller supported by the first host, and wherein the local controller is configured to determine the packet flow information identifier assigned to the second host based on the corresponding notification; and
invalidate the packet flow information stored in association with the packet flow information identifier.

12. The first host of claim 11, wherein the instructions to determine the packet flow information identifier cause the processor to:
based on at least a host identifier associated with the second host in the notification, determine the packet flow information identifier associated with the host identifier.

13. The first host of claim 11, wherein the instructions to cause the processor to invalidate the packet flow information cause the processor to:
generate and send, by the local controller, an instruction to the flow-based forwarding element to remove the packet flow information stored in association with the packet flow information identifier.

14. The first host of claim 11, wherein the instructions to cause the processor to learn the packet flow information cause the processor to:
match, by the flow-based forwarding element, the one or more packets with a second packet processing rule configured in the flow table; and
perform a learn action, specified by the second packet processing rule, to learn the packet flow information.

15. The first host of claim 11, wherein the instructions to cause the processor to receive the notification cause the processor to:

receive the notification in response to the third host or the management entity detecting at least one of the following network topology changes: a failover from the second host to the third host, migration of a virtualized computing instance from the second host to the third host, and load balancing between the second host and the third host.

\* \* \* \* \*